Figure 1:
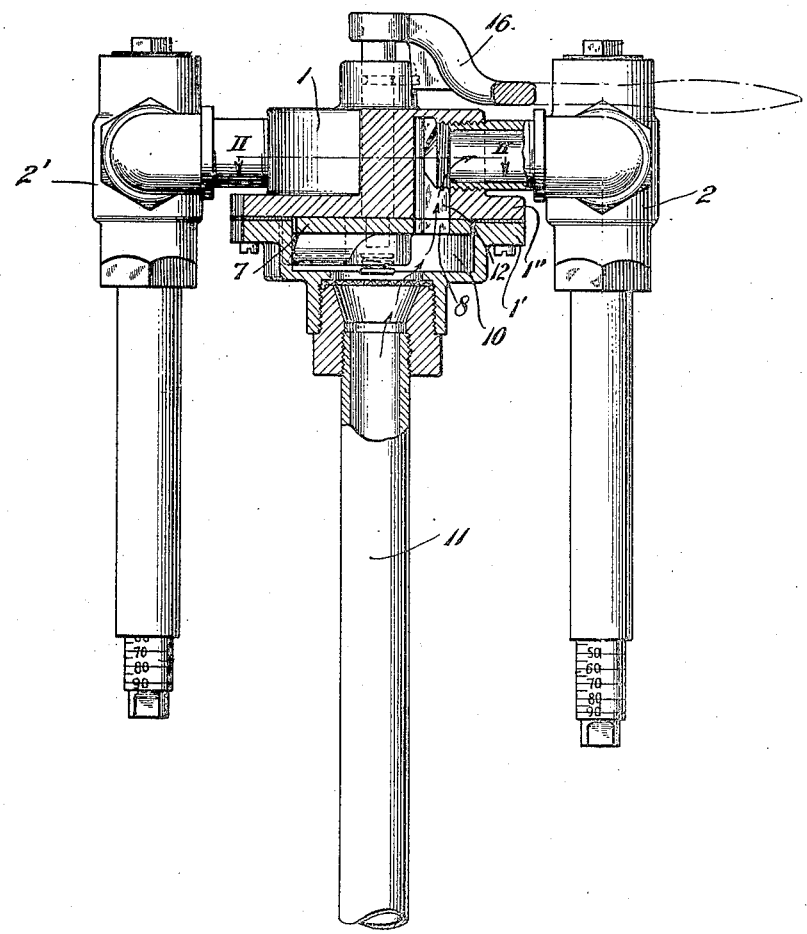

Nov. 20, 1923.

M. C. MAYO

PRESSURE REGULATOR

Filed June 1, 1922

1,474,841

2 Sheets-Sheet 1

Inventor

Milford C. Mayo

By Freash and Bond

Attorneys

Nov. 20, 1923.
M. C. MAYO
PRESSURE REGULATOR
Filed June 1, 1922
1,474,841
2 Sheets-Sheet 2
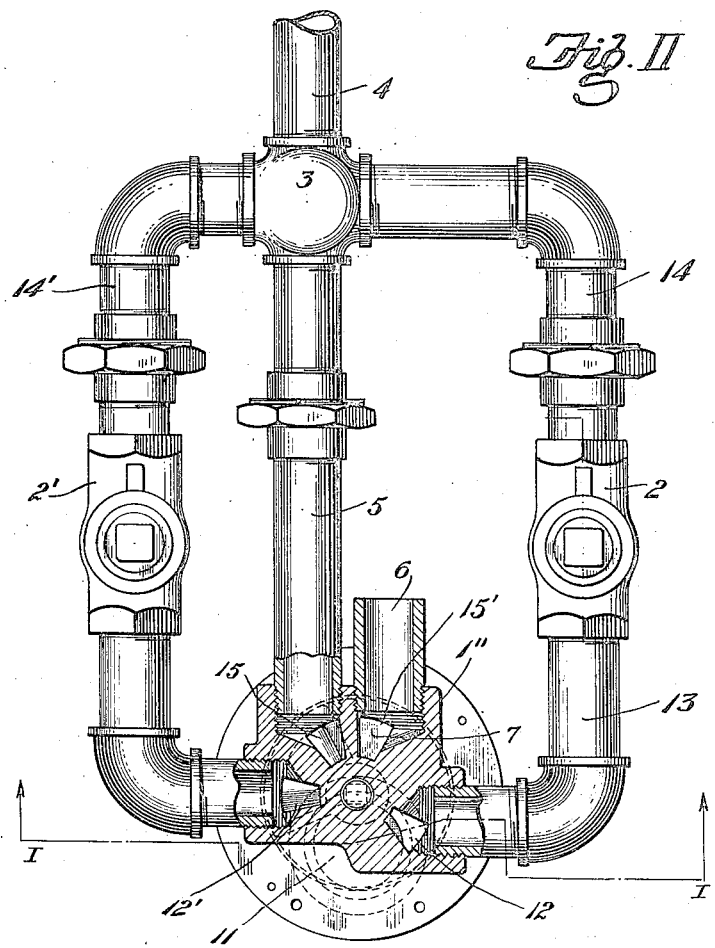
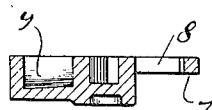
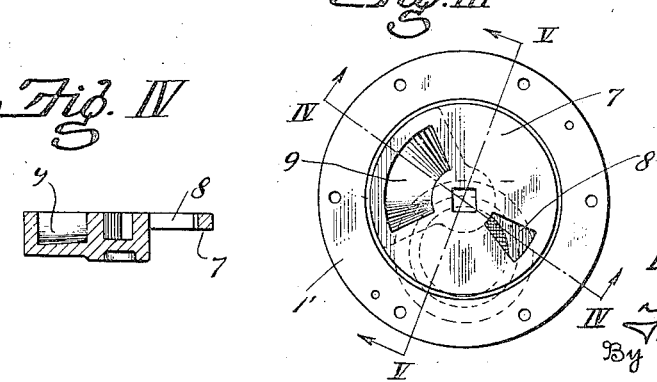
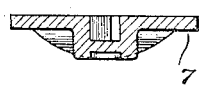
Inventor
Milford C. Mayo
By
Attorneys Patented Nov. 20, 1923.

1,474,841

UNITED STATES PATENT OFFICE.

MILFORD C. MAYO, OF CANTON, OHIO, ASSIGNOR TO THE CANTON PNEUMATIC TOOL COMPANY, OF CANTON, OHIO, A CORPORATION OF OHIO.

PRESSURE REGULATOR.

Application filed June 1, 1922. Serial No. 565,249.

*To all whom it may concern:*

Be it known that I, MILFORD C. MAYO, a citizen of the United States, residing at Canton, in the county of Stark and State of Ohio, have invented certain new and useful Improvements in Pressure Regulators, of which the following is a specification.

The invention relates to an air pressure regulator; and the object of the improvement is to combine a controlling valve and one or more regulating valves, with pipes and fitting for exhausting air through the controlling valve without returning through the regulating valves.

A differential pressure is frequently required in the operation of molding and like machines, and the present improvement also involves the use of a single valve for supplying air from a high pressure supply pipe, at different lower pressures to a service pipe.

For instance, in the use of air squeezers for pressing molds, in foundry work, it is often desirable to press the drag with a lower pressure than is furnished by the high pressure supply; and to press the cope with a pressure lower than has been used to squeeze the drag.

In other cases, it may be desired to squeeze the drag with the initial high pressure of the air supply; and then squeeze the cope with a lower pressure; and the present improvement involves the use of means for attaining either result, by the use of a single controlling valve and one or more regulating valves.

The invention is illustrated in the accompanying drawings, forming part hereof, in which—

Figure I is a front elevation of the apparatus, showing the controlling valve in section on line I—I, Fig. II;

Fig. II, a plan view of the same, showing the controlling valve in section on line II—II, Fig. I;

Fig. III, a plan of the controlling disk valve and the lower section of the controlling valve case;

Fig. IV, a section of the disk valve on line IV—IV, Fig. III;

Fig. V, a section of the disk valve on line V—V, Fig. III.

Similar numerals refer to similar parts throughout the drawings.

The apparatus may include a controlling valve 1, two regulating valves 2 and 2', a four way fitting 3, a service pipe 4, a return pipe 5 and an exhaust pipe 6.

Within the controlling valve case is operatively mounted a rotatable disk valve 7 having an inlet port 8 and an exhaust recess 9 in opposite sides of its center; one side of the valve disk being exposed to an inlet chamber 10 formed by the lower section 1' of the case and communicating with an air supply pipe 11, which in turn communicates with a source of air under high pressure.

The other side of the disk valve operates flatwise against the body 1" of the case, in which is provided air ports 12 and 12', one of which communicates with a pipe 13 leading to one regulating valve 2 and the other of which leads to the regulating valve 2'.

A pipe 14 leads from the one regulating valve to the four way fitting 3, and a pipe 14' leads from the other regulating valve to the same fitting; whence the service pipe 4 leads to a cylinder, not shown, or other place of use and the return pipe 5 communicates with a return port 15 in the controlling valve case located adjacent to an exhaust port 15' therein, which communicates with the exhaust pipe 6 leading therefrom.

The exhaust recess 9 in the disk valve, is in the form of an annular segment, and is adapted to establish communication between the return port 15 and the exhaust port 15' when registering therewith, so as to make a channel for exhausting air from the return pipe. The ports are so arranged that the exhaust recess in the disk valve will not open communication between the ports 15 and 15' in the case, when the inlet port 8 registers with either one of the inlet ports 12 or 12' in the case.

The controlling valve is provided with an operating handle 16, by means of which it may be rotated one way to register the inlet port 8 in the disk valve with the inlet port 12 in the case, or the other way to register the inlet port 8 in the disk valve with the inlet port 12' in the case; or to an intermediate portion to register the exhaust recess 9 in the valve with the return and exhaust ports 15 and 15' in the case. This arrangement permits air pressure to be alternately supplied to the service pipe, through either one or the other of the regulators, and permits air to be exhausted from the service pipe without returning through either one of the regulators.

In the use of the apparatus one regulator may be adjusted for a pressure of say forty pounds, as indicated to the right, in Fig. 1, and the other regulator may be adjusted to a pressure of say sixty pounds, as indicated to the left in the same figure, and the controlling valve may be operated to alternately admit air under higher pressure, to either one or the other of the regulating valves; whence it passes at a reduced pressure to the service pipe and when the work is finished, an operation of the controlling valve to an intermediate position will exhaust the air from the cylinder through the return pipe 5 and the exhaust pipe 6, without returning through the regulating valve; and such an exhaust will occur whenever the valve is operated from the port leading to one regulating valve to the port leading to the other regulating valve.

It is evident that by merely substituting a straight through pipe for one of the regulating valves, so that the initial high pressure can be carried to the service pipe when the controlling valve is operated one way; a reduced pressure can be carried to the service pipe through the one remaining regulator valve, by operating the controlling valve the other way.

I claim:

1. A pressure regulator including a regulating valve, a service pipe and a return pipe communicating with each other and with the regulating valve, and a controlling valve connected with the regulating valve and with the return pipe for alternately supplying compressed air to the regulating valve and exhausting air from the return pipe when not supplying air to the regulating valve.

2. A pressure regulator including two regulating valves, a service pipe and a return pipe communicating with each other and with each regulating valve, and a controlling valve connected with each regulating valve for alternately supplying compressed air to one or the other of the regulating valves and exhausting air from the return pipe when not supplying air to either one of the regulating valves.

MILFORD C. MAYO.